United States Patent [19]

Caswell

[11] 4,102,968

[45] Jul. 25, 1978

[54] AGGLOMERATION OF FINELY DIVIDED SULFUR PARTICLES IN A LIQUID SUSPENSION

[75] Inventor: Bruce F. Caswell, Green Oaks Township, Livingston County, Mich.

[73] Assignee: Arcanum Corporation, Ann Arbor, Mich.

[21] Appl. No.: 814,486

[22] Filed: Jul. 11, 1977

[51] Int. Cl.² ............................................. B01J 2/28
[52] U.S. Cl. ..................................... 264/117; 264/37; 425/6; 425/10
[58] Field of Search ....................... 264/11, 37, 117, 9; 425/6, 8, 10

[56] References Cited

U.S. PATENT DOCUMENTS

| 1,397,099 | 11/1921 | Hill ............................................ 264/11 |
| 3,268,071 | 8/1966 | Puddington ............................. 264/9 |
| 3,504,061 | 3/1970 | Elliott ....................................... 264/9 |
| 3,760,050 | 9/1973 | Blaker ................................... 264/117 |

Primary Examiner—Robert F. White
Assistant Examiner—J. R. Hall
Attorney, Agent, or Firm—Blanchard, Flynn, Thiel, Boutell & Tanis

[57] ABSTRACT

Finely divided sulfur particles in a liquid suspension are agglomerated by adding molten sulfur to the suspension and agitating the mixture to transform the particles into agglomerates wherein the finely divided sulfur particles are held together by the previously molten, now solidified sulfur, acting as a binder agent.

7 Claims, 1 Drawing Figure

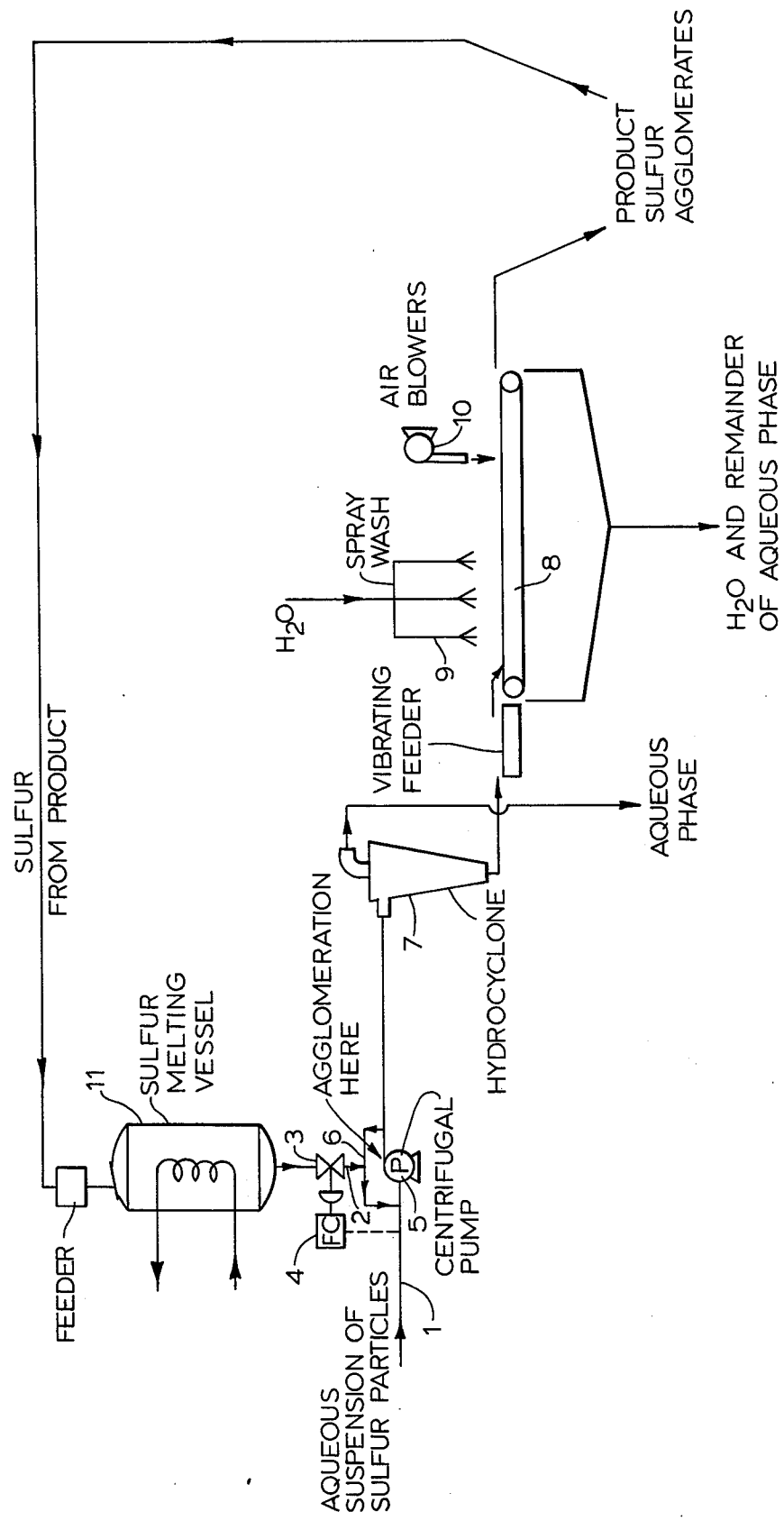

AGGLOMERATION OF FINELY DIVIDED SULFUR PARTICLES IN A LIQUID SUSPENSION

This invention relates to a process for agglomerating finely divided sulfur particles which are suspended in an aqueous liquid medium.

Aqueous suspensions of finely divided sulfur particles are produced in various industrial processes. An important example of such a suspension is the aqueous suspension obtained by scrubbing a stack gas with a citrate solution in order to remove sulfur dioxide therefrom. This known process transforms the sulfur dioxide to elemental sulfur. Another example is the aqueous suspension obtained by the Stretford process for removing hydrogen sulfide from petroleum gases. It is desired to remove the sulfur particles from such suspensions in order to recover the economic value of the sulfur and to purify the liquid phase so that it can be recycled to the industrial process and/or so that it can be discharged to waste water treatment facilities.

The general process of treating liquid suspensions of finely divided solids to form agglomerates of the solids is well known. Examples of this process are disclosed in U.S. Pat. Nos. 3,268,071, 3,368,004 and 3,471,267. U.S. Pat. No. 3,268,071 discloses separating sulfur balls from a suspension of sulfur particles and graphite (or silica) particles, in Varsol, by a two stage process in which graphite (or silica) particles are removed in the first separation stage and then sulfur particles present in the liquid product from the first separation stage are formed into balls by adding thereto an aqueous solution of sodium hydroxide and conducting appropriate agitation to form the sulfur particles into compact, more-or-less spherical agglomerates.

SUMMARY OF THE INVENTION

This invention provides an improved process for separating finely divided sulfur particles from an aqueous suspension thereof by adding molten (liquid) sulfur to the suspension, then agitating the mixture to form agglomerates of said particles and then separating the agglomerates from the aqueous phase. The molten sulfur undergoes a phase change from the liquid phase to the solid phase while it is being agitated with the aqueous suspension so that it picks up and holds together the finely divided sulfur particles whereby there are formed agglomerates consisting essentially of elemental sulfur. The agglomerates consist essentially of the sulfur particles from the liquid suspension feed stream, plus the sulfur that was supplied to the agglomeration process in molten form and was solidified in situ therein. Because of the fact that liquid sulfur is used as the agglomerating agent and the liquid sulfur can be obtained by melting a portion of the final agglomerated sulfur product, the process is advantageous because no extraneous chemicals are added to the system. Of course, it will be necessary to add molten sulfur at start-up of the process, but once sulfur agglomerate product is produced, then a portion of it can be melted to supply the liquid sulfur for continuing the agglomeration process. Thus, the process is economical and does not involve adding other chemicals which might require further purification of the discharged liquid and/or the sulfur agglomerate product. Also, the process of the invention is well adapted for automated operation.

According to the present invention, there is provided a process for forming agglomerates of finely divided sulfur particles, consisting essentially of continuously feeding (1) a first stream of a suspension of finely divided sulfur particles in a liquid aqueous medium and (2) a second stream consisting essentially of molten sulfur, into an agglomeration system and continuously agitating the contents of said agglomeration system to effect repeated collisions between said sulfur particles and contact between said sulfur particles and the liquid sulfur as it solidifies during the agitation whereby to cause said sulfur particles to adhere to each other and to the solidifying liquid sulfur to form agglomerates thereof, then separating the solid sulfur agglomerates from the aqueous phase and recovering the sulfur agglomerates.

BRIEF DESCRIPTION OF THE DRAWING

The drawing is a flow diagram of an embodiment of the process of the invention.

Referring to the drawing, a first stream of the aqueous suspension containing finely divided sulfur particles is continuously fed in through conduit 1. A second stream of molten sulfur is continuously fed in through conduit 2 so as to be mixed with the aqueous suspension to form a combined stream of the first and second streams. In the illustrated embodiment of the invention, the molten sulfur is flowed into the feedback conduit 6 of the pump loop, as hereinafter described. The flow rate of the molten sulfur is controlled by a valve 3 which is operated by a flow controller 4 which in turn is responsive to the flow rate of the aqueous suspension in conduit 1 whereby the flow rate of the molten sulfur is coordinated with and is responsive to the flow rate of the aqueous suspension. Control systems for operating a valve in response to the flow rate in a conduit are well-known and need not be described herein.

The combined stream is agitated in the agglomeration system as the molten sulfur therein solidifies, whereby to form agglomerates. In the illustrated apparatus, the agglomeration system is a pump loop comprised of a centrifugal pump 5 and a feedback conduit 6 for returning a selected portion of the discharge of the pump to the inlet thereof. If desired, a flow control valve (not shown) can be provided in the feedback conduit 6 for adjusting the flow rate of the recycle stream and thereby controlling the average residence time of the combined stream in the pump loop. During the time they are present in the pump loop, the finely divided sulfur particles are formed into compact agglomerates wherein the finely divided particles are held together by the previously molten sulfur which has solidified in situ in contact with the finely divided particles. The molten sulfur is insoluble in and immiscible with the aqueous liquid phase and it preferentially wets the finely divided sulfur particles by displacing the aqueous phase, whereby to cause the sulfur particles to bond together. The product discharged from the pump loop is a slurry or suspension of sulfur agglomerates in an aqueous liquid phase.

The sulfur agglomerates are then separated from the aqueous phase. In the illustrated embodiment the product discharged from the pump loop is fed to a hydrocyclone 7 wherein it is separated into a liquid aqueous phase substantially free of sulfur agglomerates, removed as the overflow, and a phase consisting essentially of sulfur agglomerates containing a minor portion of the aqueous phase, removed as the underflow. Although the invention is not critically limited to separation in a hydrocyclone, the use of a hydrocyclone is highly advantageous and is preferred because it effects a good separation of the aqueous phase without diluting same. This is advantageous when the aqueous phase contains dissolved chemicals and it is desired to recycle it to the process used to make the aqueous suspension of sulfur particles.

The underflow from the hydrocyclone 7 is fed by a vibratory feeder onto a screen-type conveyor 8 whereon it is washed by water from sprays 9 to remove residual aqueous phase and then is dried by air streams from blowers 10. The sulfur product (agglomerates of sulfur) is thereby obtained. A portion of the product sulfur is fed to the sulfur melting vessel 11 for supply to the conduit 2.

The above-described equipment for recovering the sulfur agglomerates is not critical. Various types of screens, filters, washing devices and drying devices can be used in place of the equipment shown in the drawing.

Referring now to the operating parameters of the process, the aqueous suspension of finely divided sulfur particles fed in through conduit 1 can be obtained from various sources. The aqueous phase thereof is liquid water which may contain various chemicals dissolved therein. These chemicals, if present, are substantially inert in the agglomeration process. The particle size of the sulfur particles is less than about 12 mesh (Tyler standard) and preferably is less than about 50 mesh. The minimum particle size of the sulfur particles is not critical. It can be as low as about 400 mesh or even lower. The concentration of sulfur particles in the suspension is not critical. The suspension is a pumpable, reasonably free flowing liquid and the sulfur particle concentration thereof is usually in the range of from about one to about 20 wt.%, preferably about 8 to 12 wt.%, based on the total weight of the suspension. The temperature of the suspension is subject to variation, as will be discussed further hereinbelow. It normally is at an elevated temperature, but below 100° C. For example the suspension can be at a temperature of about 60° to about 90° C, preferably between about 70° to about 80° C.

The molten sulfur supplied through conduit 2 is at a temperature at which it is molten, i.e., at 112.8° C or higher, but below its boiling point. For reasons of fuel economy, ease of handling and convenience, it is preferred to employ a temperature of the molten sulfur in the range of from the melting point thereof (112.8° C) up to about 130° C. The amount of molten sulfur added to the suspension is selected based on the considerations described below.

The stream of molten sulfur and the stream of the aqueous sulfur particle suspension are jointly vigorously agitated in the agglomeration system to cause large numbers of collisions between the particles as well as intimate contacting and mixing of the particles with the liquid sulfur as it is undergoing a phase change from liquid to solid, in situ, in contact with the solid particles. The agitating and agglomerating mechanism can be selected from among the equipment known to be useful for this purpose including reciprocal shakers, rotating drums, pump loops (shown in the drawing), tanks with propeller-type agitators and in-line mixers. The particular equipment used will depend on the desired properties of the agglomerates, i.e., density. Shakers will be used when agglomerates of high density and strength are wanted. However, for most purposes, the sulfur agglomerates need not possess high density and strength. Under these circumstances a pump loop is highly effective and is preferred because of its ease of operation.

It is an essential requirement of the invention that the molten sulfur supplied through conduit 2 shall not completely solidify instantaneously when it first contacts the aqueous suspension fed through conduit 1. Rather, it is required that a sufficient amount of the molten sulfur shall remain molten for a sufficient period of time so that it wets the finely divided sulfur particles in the suspension and it does not completely solidify until after it has been thoroughly agitated, mixed and contacted with the solid sulfur particles in the suspension in order to form sulfur agglomerates. That is, the molten sulfur, considered in bulk, must undergo a phase change from the liquid state to the solid state over a period of time which permits vigorous agitation, mixing and collision thereof with the sulfur particles in the suspension, so that the bulk of the phase change occurs while the initially molten sulfur is in intimate wetting contact with the sulfur particles in the suspension. It will be appreciated that the molten sulfur may melt some of the sulfur particles in the suspension or surface layer portions thereof, but it is believed that the principal effect of the invention is that the molten sulfur wets the surfaces of the finely divided sulfur particles to cause them to stick together and then the molten sulfur itself solidifies whereby to obtain solid agglomerates consisting essentially of the finely divided sulfur particles from the starting suspension bonded together by solidified (previously molten) sulfur.

The characteristics of the aqueous suspension, particularly its volume and temperature, the temperature and volume of the molten sulfur and the intensity of agitation of the combined stream all affect the desired results. For example, as the volume of the aqueous suspension increases or its temperature decreases, then one would correspondingly increase the volume of the molten sulfur and/or its temperature so as to avoid an immediate quenching and solidification of all the molten sulfur as soon as it contacts the suspension. Thus, it is preferred that the aqueous suspension be at an elevated temperature in order to make it possible to reduce the amount and/or the temperature of the molten sulfur that is added. It has been found that, in order to effect sufficient agglomeration, the weight ratio of $$\frac{\text{molten sulfur}}{\text{sulfur particles in the suspension}}$$

should be at least about (0.05/1), preferably (0.10/1). There is no critical maximum of this ratio but, for economic reasons, it will normally be impractical to use a ratio of more than about (0.40/1).

The above-described values are set forth as being typical parameters that will be useful and practical in most situations. It is desired to point out, however, that departures can be made from those parameters. Changes in the sulfur content or temperature of the suspension may require changes in the amount and/or temperature of the molten sulfur. The skilled worker can readily determine appropriate operating conditions for any specific process by experimentation following the general guidelines described above.

EXAMPLE

Using a system as illustrated in the drawing, there is fed in through conduit 1,300 tons per day of an aqueous suspension produced by the Stretford process for treating petroleum gas in a refinery. The suspension has a temperature of about 75° C and it contains about 10 wt.% of finely divided sulfur particles having a particle size of less than about 50 mesh (Tyler standard). There is fed through the conduit 2, 0.1875 tons per hour of molten sulfur having a temperature of about 115° C. The combined stream flows through a centrifugal pump rated at about 48 gallons per minute output and about 20% of the output is recycled to the input of the pump. The product removed from the pump loop consists of a slurry of the aqueous phase containing about 11.3 wt.% of sulfur agglomerates. The slurry is fed into a hydrocyclone wherein the sulfur agglomerates are removed as the underflow. These agglomerates are fed onto a screen conveyor whereon they are washed with water for 5 minutes, water is drained therefrom for 16 minutes and then air is blown thereagainst for 5 minutes. There is recovered about 2875 pounds per hour of sulfur particles.

The embodiments of the invention in which an exclusive property or privilege is claimed are defined as follows:

1. A process for preparing agglomerates of finely divided sulfur particles, which comprises the steps of continuously feeding into an agglomeration system (1) a first stream of a suspension of finely divided sulfur particles suspended in an aqueous liquid medium, and (2) a second stream consisting essentially of molten sulfur, continuously agitating the contents of the agglomeration system to effect collisions between said sulfur particles and contacts between said sulfur particles and said molten sulfur so that the surfaces of said sulfur particles are wetted with said molten sulfur so as to cause said particles to stick together and to cause said molten sulfur to solidify, in situ, while it is undergoing agitation and is in contact with the sulfur particles whereby to form solid sulfur agglomerates, and then recovering said sulfur agglomerates from the liquid phase.

2. A process according to claim 1, wherein said suspension consists essentially of water having suspended therein from one to 20 weight percent of finely divided sulfur particles having a particle size of less than about 12 mesh, said suspension being at a temperature of from about 60° to about 90° C.

3. A process according to claim 1, wherein said suspension consists essentially of water having suspended therein for 8 to 12 weight percent of finely divided sulfur particles having a particle size of less than about 50 mesh, said suspension being at a temperature of from about 70° C to about 90° C.

4. A process according to claim 1 wherein said molten sulfur is at a temperature of from the melting point thereof up to about 130° C and the amount of molten sulfur fed in is from about 5 to 40 weight percent, based on the weight of the sulfur particles in said suspension.

5. A process according to claim 1 wherein said aqueous medium remains substantially in the liquid phase throughout said mixing and agitating steps.

6. A process according to claim 1 wherein said agglomeration system is a pump loop consisting essentially of centrifugal pump means and conduit means extending from the discharge of said centrifugal pump means to the inlet thereof, said first and second streams being fed to said conduit means and being combined therein and then being fed to said centrifugal pump means.

7. A process according to claim 1, in which the slurry of aqueous liquid phase and solid sulfur agglomerates is fed into a hydrocyclone and is therein separated into an overflow consisting essentially of said aqueous liquid phase free of said agglomerates and an underflow consisting essentially of said sulfur agglomerates wetted with a portion of said aqueous liquid phase.

* * * * *